(12) United States Patent
Apostolo et al.

(10) Patent No.: US 8,513,351 B2
(45) Date of Patent: *Aug. 20, 2013

(54) FLUOROELASTOMER GELS

(75) Inventors: Marco Apostolo, Novara (IT); Stefano Arrigoni, Novara (IT); Margherita Albano, Milan (IT)

(73) Assignee: Solvay Solexis S.p.A., Milan (IT)

( * ) Notice: Subject to any disclaimer, the term of this patent is extended or adjusted under 35 U.S.C. 154(b) by 0 days.

This patent is subject to a terminal disclaimer.

(21) Appl. No.: 11/158,334

(22) Filed: Jun. 22, 2005

(65) Prior Publication Data

US 2005/0282955 A1 Dec. 22, 2005

(30) Foreign Application Priority Data

Jun. 22, 2004 (IT) .......................... MI2004A001253

(51) Int. Cl.
*C08F 116/12* (2006.01)
(52) U.S. Cl.
USPC .................... 524/544; 525/326.2; 526/247
(58) Field of Classification Search
USPC .............. 524/544; 526/247; 525/326.2
See application file for complete search history.

(56) References Cited

U.S. PATENT DOCUMENTS

| | | | | |
|---|---|---|---|---|
| 3,752,787 | A | | 8/1973 | De Brunner |
| 3,810,874 | A | | 5/1974 | Mitsch et al. |
| 3,876,654 | A | | 4/1975 | Pattison |
| 4,035,565 | A | | 7/1977 | Apotheker et al. |
| 4,115,481 | A | | 9/1978 | Finlay et al. |
| 4,233,427 | A | | 11/1980 | Bargain et al. |
| 4,243,770 | A | | 1/1981 | Tatemoto et al. |
| 4,259,463 | A | | 3/1981 | Moggi et al. |
| 4,281,092 | A | | 7/1981 | Breazeale |
| 4,320,216 | A | * | 3/1982 | Apotheker ............ 526/248 |
| 4,564,662 | A | | 1/1986 | Albin |
| 4,694,045 | A | | 9/1987 | Moore |
| 4,745,165 | A | | 5/1988 | Arcella et al. |
| 4,789,717 | A | | 12/1988 | Giannetti et al. |
| 4,864,006 | A | | 9/1989 | Giannetti et al. |
| 4,943,622 | A | | 7/1990 | Naraki et al. |
| 4,990,283 | A | | 2/1991 | Visca et al. |
| 5,173,553 | A | | 12/1992 | Albano et al. |
| 5,447,993 | A | | 9/1995 | Logothetis |
| 5,585,449 | A | * | 12/1996 | Arcella et al. ........... 526/247 |
| 5,616,645 | A | * | 4/1997 | Kuwamura et al. ...... 524/546 |
| 5,674,959 | A | | 10/1997 | Arcella et al. |
| 5,789,489 | A | | 8/1998 | Coughlin et al. |
| 5,902,857 | A | | 5/1999 | Wlassics et al. |
| 5,948,868 | A | | 9/1999 | Albano et al. |
| 6,013,712 | A | * | 1/2000 | Chittofrati et al. ........ 524/366 |
| 6,160,053 | A | | 12/2000 | Enokida et al. |
| 6,734,254 | B1 | | 5/2004 | Worm et al. |
| 6,764,763 | B1 | * | 7/2004 | Tomihashi et al. ........ 428/375 |
| 2002/0177664 | A1 | | 11/2002 | Albano et al. |
| 2003/0153674 | A1 | * | 8/2003 | Visca et al. .............. 524/801 |
| 2003/0187144 | A1 | * | 10/2003 | Staccione et al. ........ 525/326.2 |
| 2004/0019153 | A1 | | 1/2004 | Coughlin et al. |
| 2004/0092653 | A1 | * | 5/2004 | Ruberti et al. ........... 524/563 |
| 2004/0167272 | A1 | | 8/2004 | Wu et al. |
| 2004/0220361 | A1 | | 11/2004 | Fukuda et al. |

FOREIGN PATENT DOCUMENTS

| | | |
|---|---|---|
| EP | 01 120 462 A1 | 10/1984 |
| EP | 0 136 596 A2 | 4/1985 |
| EP | 0 182 299 A2 | 5/1986 |
| EP | 0 199 138 B1 | 10/1986 |
| EP | 0 335 705 A1 | 10/1989 |
| EP | 0 410 351 A1 | 1/1991 |
| EP | 0 661 304 B1 | 7/1995 |
| EP | 0 684 277 A1 | 11/1995 |
| EP | 0769520 | 4/1997 |
| EP | 0769521 | 4/1997 |
| EP | 0 860 436 B1 | 8/1998 |
| EP | 0 979 832 B1 | 2/2000 |
| EP | 1 031 606 A1 | 8/2000 |
| EP | 1 031 607 A1 | 8/2000 |
| EP | 1097948 | 5/2001 |
| EP | 1262497 A2 | 12/2002 |
| EP | 1279681 A2 * | 1/2003 |
| EP | 1609806 A1 * | 12/2005 |
| WO | WO 02088248 A1 | 11/2002 |

OTHER PUBLICATIONS website: http://en.wikipedia.org/wiki/Vinyl_polymer.*
website:http://sciencelinks.jp/j-east/article/200707/000020070705A0448623.php.*
Jounal of Statistical Physics—"Coagulation Equation with Gelation" by E.M. Hendriks, M.H. Ernst and R.M. Ziff; vol. 31, No. 3, 1983.*
Journal of Statistical Physics—"On the occurrence of gelation transition in Smoluchowski's Coagulation Equation" by van Dongen and M.H.Ernst; vol. 44, No. 5/6, 1986.*
I. L. Knunyants et al., "Fluorinated Diiodoalkanes and Diolefins," Institute of Heteroorganic Compounds, Academy of Sciences, USSR, Feb. 1964, pp. 384-386, corresponding English translation pp. 358-361.
I.L. Knunyants et al.; Institute of Heteroorganic Compounds; Academy of Sciences; USSR Translated from Izvestiya Akademii Nauk SSSR, Ser. Khim; No. 2; Feb. 1964; pp. 384-386 (corresponding to pp. 358-361 of English Translation).

* cited by examiner

*Primary Examiner* — Peter D. Mulcahy
*Assistant Examiner* — Henry Hu
(74) *Attorney, Agent, or Firm* — Arent Fox LLP

(57) ABSTRACT

Fluoroelastomeric gel having the following properties:
appearance: transparent gelatinous solid;
water content between 10% and 90% by weight;
a density between 1.1 and 2.1 g/cm$^3$;
said gel satisfies the following test: dried in a stove at 90° C. until a constant weight gives curable fluoroelastomers.

38 Claims, No Drawings

FLUOROELASTOMER GELS

This claims priority to Italian patent application no. MI2004 A 001253, filed June 22, 2004, the contents of which are incorporated herein, in their entirety, by reference.

The present invention relates to fluoroelastomeric compositions having an improved thermal resistance, improved sealing properties, improved mechanical properties.

The cured fluoroelastomers of the present invention are used in the preparation of manufactured articles as O-ring, gaskets, shaft seals, fuel hoses, etc., showing the combination of the above improved properties.

It is known that crosslinked fluoroelastomers are used for their high properties of chemical resistance, thermal resistance, good sealing properties and low permeability. The request of the market is to have available fluoroelastomers having improved above properties. See for example patents EP 1,031,607, EP 1,031,606, U.S. Pat. Nos. 5,585,449, 5,948,868, 5,902,857.

Generally in the prior art crosslinked fluoroelastomers are used at temperatures higher than 200° C. The maximum rating temperature of a crosslinked fluoroelastomer depends on the used curing system. Generally it is also known that by increasing the rating temperature, the sealing and thermal resistance properties remarkably worsen.

The need was felt to have available fluoroelastomers having an improved thermal resistance, improved sealing properties, improved mechanical properties.

The Applicant has found a solution to the above technical problem to obtain fluoroelastomers having the combination of the above improved properties.

An object of the present invention are fluoroelastomeric gels having the following properties:
appearance: transparent gelatinous solid;
water content between 10% and 90% by weight;
density between 1.1 and 2.1 g/cm$^3$;
the gel satisfying the following test: the gel subjected to drying in a stove at 90° C. until a constant weight gives a curable fluoroelastomer.

Cured fluoroelastomers are obtained, from said curable fluoroelastomers, having an improved thermal resistance, improved sealing properties, improved mechanical properties compared with the fluoroelastomers obtained according to the prior art, therefore not from fluoroelastomeric gels.

Said gels are obtainable with the process described hereunder.

The fluoroelastomeric gel of the invention contains vinylidenfluoride (VDF)-based fluoroelastomers with at least another (per)fluorinated comonomer having at least one unsaturation of ethylene type.

Preferably the comonomer is selected from the following:
CF$_2$=CFOR$_f$ (per)fluoroalkylvinylethers (PAVE), wherein R$_f$ is a C$_1$-C$_6$ (per)fluoroalkyl;
CF$_2$=CFOX (per)fluorooxyalkylvinylethers, wherein X is a C$_1$-C$_{12}$ (per)fluorooxyalkyl, containing one or more ether groups;
(per)fluorodioxoles, preferably perfluorodioxoles;
(per)fluorovinylethers (MOVE) of general formula CFX$_{AI}$=CX$_{AI}$OCF$_2$OR$_{AI}$ (A-I) wherein R$_{AI}$ is a C$_2$-C$_6$, linear, branched or C$_5$-C$_6$ cyclic perfluoroalkyl group, or a C$_2$-C$_6$ linear, branched perfluorooxyalkyl group containing from one to three oxygen atoms; R$_{AI}$ can optionally contain from 1 to 2 atoms, equal or different, selected from the following: Cl, Br, I; X$_{AI}$=F; the compounds of general formula: CFX$_{AI}$=CX$_{AI}$OCF$_2$OCF$_2$CF$_2$Y$_{AI}$ (A-II) are preferred, wherein Y$_{AI}$=F, OCF$_3$; X$_{AI}$ as above; in particular (MOVE 1) CF$_2$=CFOCF$_2$OCF$_2$CF$_3$ and (MOVE 2) CF$_2$=CFOCF$_2$OCF$_2$CF$_2$OCF$_3$;

C$_2$-C$_8$ (per)fluoroolefins; as, for example, tetrafluoroethylene, hexafluoropropene, hydropentafluoropropene, vinyl fluoride;

C$_2$-C$_8$ (per)fluoroolefins containing chlorine and/or bromine and/or iodine atoms;

perfluorovinylethers containing hydrocyanic groups as described in patents U.S. Pat. Nos. 4,281,092, 5,447,993, 5,789,489.

Preferred monomeric compositions of the fluoroelastomers are the following, in % by moles:
(a) VDF 45-85%, HFP 15-45%, TFE 0-30%;
(b) VDF 50-80%, PAVE 5-50%, TFE 0-20%;
(c) VDF 20-30%, O1 10-30%, HFP and/or PAVE 18-27%, TFE 10-30%;
(d) TFE 45-65%, O1 20-55%, VDF 0-30%;
(e) TFE 33-75%, PAVE 15-45%, VDF 5-30%;
(f) VDF 45-85%, MOVE 1 5-50%, PAVE 0-50%; HFP 0-30%, TFE 0-30%;
(g) VDF 45-85%, MOVE 2 5-50%, PAVE 0-50%; HFP 0-30%, TFE 0-30%;
(h) VDF 45-85%, MOVE 2 5-50%, MOVE 1 5-50%, PAVE 0-50%; HFP 0-30%, TFE 0-30%;
the sum of the monomer per cent being 100%. The term O1 means non-fluorinated C$_2$-C$_4$ olefins.

Preferably the fluoroelatomers comprise also monomeric units deriving from a bis-olefin of general formula:

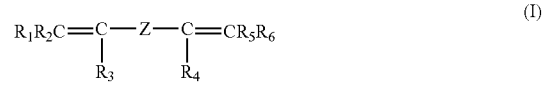

(I)

wherein:
R$_1$, R$_2$, R$_3$, R$_4$, R$_5$, R$_6$, equal to or different from each other, are H or C$_1$-C$_5$alkyls;
Z is a C$_1$-C$_{18}$ linear or branched alkylene or cycloalkylene radical, optionally containing oxygen atoms, preferably at least partially fluorinated, or a (per)fluoropolyoxyalkylene radical, as described in patent EP 661,304 in the name of the Applicant.

In formula (I), Z is preferably a C$_4$-C$_{12}$, more preferably C$_4$-C$_8$, perfluoroalkylene radical, while R$_1$, R$_2$, R$_3$, R$_4$, R$_5$, R$_6$ are preferably hydrogen;
when Z is a (per)fluoropolyoxyalkylene radical, it can comprise units selected from the following:

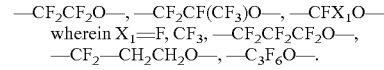

Preferably Z has formula:

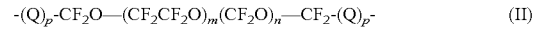

(II)

wherein: Q is a C$_1$-C$_{10}$ alkylene or oxyalkylene radical; p is 0 or 1; m and n are numbers such that the m/n ratio is between 0.2 and 5 and the molecular weight of said (per)fluoropolyoxyalkylene radical is in the range 500-10,000, preferably 700-2,000.

Preferably Q is selected from:

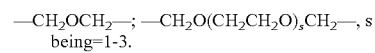

The bis-olefins of formula (I) wherein Z is an alkylene or cycloalkylene radical can be prepared according to what described, for example, by I. L. Knunyants et al. in "Izv. Akad. Nauk. SSSR", Ser. Khim., 1964(2), 384-6. The bis-olefins containing (per)fluoropolyoxyalkylene structures are described in U.S. Pat. No. 3,810,874.

The unit amount in the chain deriving from the bis-ole-fins of formula (I) is generally from 0.01 to 1.0 moles, preferably from 0.03 to 0.5 moles, still more preferably from 0.05 to 0.2 moles per 100 moles of the other above monomeric units, constituting the basic fluoroelastomer structure.

Optionally fluoroelastomeric gel of the invention contains a semicrystalline (per)fluoropolymer, in an amount as per cent by weight referred to the total of dry weight—fluoroelastomer+semicrystalline perfluoropolymer, from 0% to 70%, preferably from 0% to 50% by weight, still more preferably from 2% to 30% by weight.

With semicrystalline (per)fluoropolymer it is meant a (per)fluoropolymer showing, besides the glass transition temperature Tg, at least a crystalline melting temperature.

The semicrystalline (per)fluoropolymer is constituted of tetrafluoroethylene (TFE) homopolymers, or TFE copolymers with one or more monomers containing at least one unsaturation of ethylene type, in an amount from 0.01% to 10% by moles, preferably from 0.05% to 7% by moles, on the total of the monomer moles.

Said comonomers having an ethylene unsaturation are of hydrogenated and fluorinated type. Among those hydrogenated, ethylene, propylene, acrylic monomers, for example methyl-methacrylate, (meth)acrylic acid, butylacrylate, hydroxyethylhexylacrylate, styrene monomers, can be mentioned.

Among fluorinated comonomers it can be mentioned:
$C_3$-$C_8$ perfluoroolefins, as hexafluoropropene (HFP), hexafluoroisobutene;
$C_2$-$C_8$ hydrogenated fluoroolefins, as vinyl fluoride (VF), vinylidene fluoride (VDF), trifluoroethylene, $CH_2=CH-R_f$ perfluoroalkylethylene, wherein $R_f$ is a $C_1$-$C_6$ perfluoroalkyl;
$C_2$-$C_8$ chloro- and/or bromo- and/or iodo-fluoroolefins, as chlorotrifluoroethylene (CTFE);
$CF_2=CFOR_f$ (per)fluoroalkylvinylethers (PAVE), wherein $R_f$ is a $C_1$-$C_6$ (per)fluoroalkyl, for example $CF_3$, $C_2F_5$, $C_3F_7$;
$CF_2=CFOX$ (per)fluoro-oxyalkylvinylethers, wherein X is: a $C_1$-$C_{12}$ alkyl, or a $C_1$-$C_{12}$ oxyalkyl, or a $C_1$-$C_{12}$ (per)fluoro-oxyalkyl having one or more ether groups;
(per)fluorodioxoles, preferably perfluorodioxoles.

PAVEs, in particular perfluoromethyl-, perfluoroethyl-, perfluoropropylvinylether and (per)fluorodioxoles, preferably perfluorodioxoles, are preferred comonomers.

Optionally the semicrystalline (per)fluoropolymer is coated by a shell of a semicrystalline (per)fluoropolymer containing bromine and/or iodine atoms in the chain deriving from brominated and/or iodinated comonomers, in an amount from 0.1% to 10% by moles referred to the total moles of the basic monomeric units of the semicrystlaline (per)fluoropolymer core +shell, the semicrystalline (per)fluoropolymer in the core and in the shell can be of different composition. See EP 1,031,606.

The preparation of the fluoroelastomers and the semicrystalline (per)fluoropolymers of the present invention is carried out by polymerization of the monomers in aqueous emulsion in the presence of an emulsion, dispersion or microemulsion of perfluoropolyoxyalkylenes, according to patents U.S. Pat. Nos. 4,789,717 and 4,864,006. Preferably the synthesis is carried out in the presence of a perfluoropolyoxyalkylene microemulsion.

According to well known methods of the prior art, radical initiators, for example, alkaline or ammonium persulphates, perphosphates, perborates or percarbonates, optionally in combination with ferrous, cuprous or silver salts, or other easily oxidizable metals, are used. Also surfactants of various type are optionally present in the reaction medium, among which fluorinated surfactants of formula:

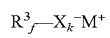

are particularly preferred, wherein $R^3_f$ is a $C_5$-$C_{16}$ (per)fluoroalkyl chain or (per)fluoropolyoxyalkyl chain, $X_k^-$ is $-COO^-$ or $-SO_3^-$, $M^+$ is selected among: $H^+$, $NH_4^+$, or an alkaline metal ion. Among the most commonly used we remember: ammonium perfluorooctanoate, (per)fluoropolyoxyalkylenes ended with one or more carboxylic groups, etc. See U.S. Pat. No. 4,990,283 and U.S. Pat. No. 4,864,006.

The polymerization reaction is generally carried out at temperatures between 25° C. and 150° C., at a pressure between the atmospheric pressure up to 10 MPa.

A further object of the present invention is a process to prepare fluoroelastomer gels starting from a fluoroelastomer polymerization latex comprising the following steps:

Ao. optionally, mixing of the fluoroelastomer latex with a semicrystalline (per)fluoropolymer latex, in an amount from 0% to 70% by weight, preferably from 0% to 50%, still more preferably from 2% to 30% by weight, referred to the total of dry weight perfluoroelastomer+semicrystalline (per)fluoropolymer;

A. optionally, dilution with water of the polymerization latex of the fluoroelastomer, or of the mixture Ao, until obtaining a fluoroelastomer concentration, expressed as g polymer/kg latex, between 50 and 600;

B. optionally, mixing of the polymerization latex Ao, or of the diluted latex A, or of the starting latex, with one or more organic compounds soluble in the latex aqueous phase, capable to lower the latex freezing point without causing the latex coagulation, said one or more organic compounds being such and/or in an amount such that the resulting mixture has the freezing point at a temperature lower than or equal to the glass transition temperature Tg (a° C.) of the latex fluoroelastomer;

C. preparation of an aqueous solution containing an electrolyte, optionally addition of one or more organic compounds as defined in B, soluble in the latex aqueous phase, capable to lower the freezing point of the solution C, and such and/or in an amount such that the resulting solution C has a freezing point lower than or equal to the freezing point of the mixture prepared in B;

D. cooling of the polymerization latex, or of the mixture Ao, or of the diluted latex A, or of the mixture B, down to a temperature T1 lower than or equal to the glass transition temperature of the latex fluoroelastomer;

E. cooling of the aqueous solution C at a temperature T2 lower than or equal to the glass transition temperture of the latex fluoroelastomer, preferably T2 being substantially equal to T1;

F. formation of a gel by dripping of the mixture D into the solution E;

G. optionally, washing with water of the gel obtained in F;

H. optionally, gel drying and obtainment of the fluoroelastomer.

In step Ao with dry weight of fluoroelastomer+semicrystalline (per)fluoropolymer it is meant the weight of the residue after having dried the latex mixture in a stove at 90° C. until a constant weight.

As said, the fluoroelastomer obtained at the end of the polymerization appears under the aqueous latex form. In step A, as said, generally the fluoroelastomer concen-tration in the latex, expressed in g polymer/kg latex, is between 50 and 600.

Preferably the latex concentration for the process for forming the fluoroelastomer gels of the present invention, is in the range 50-300, still more preferably 100-250 g polymer/kg latex.

Step A can be omitted when, after having carried out the optional step Ao, the fluoroelastomer concentration is within the above ranges.

According to the process of the present invention the optional step A can be carried out even before the optional step Ao.

In the optional step B the addition of one or more organic compounds soluble in the latex aqueous phase depends on the latex fluoroelastomer Tg (° C.). Step B is optional if the fluoroelastomer has a glass transition temperature higher than 0° C.

The organic compounds used in step B must be such, and/or added in an amount such as to lower the latex freezing point, without giving coagulation, down to a temperature value lower than or equal to the latex fluoroelastomer Tg. Generally those organic compounds lowering the freezing point of at least 1° -2° C., more preferably of at least 3° -6° C. with respect to the fluoroelastomer Tg, are preferred.

In step C, as said, one or more organic compounds as defined in B can be used. Said compounds can be equal to or different from those used in step B.

The amount of said organic compounds in the mixtures prepared in B and in C is generally from 5% to 70%, preferably from 10% to 50%, more preferably from 10% to 35%, referred to the total weight of the mixture. However the amount of said compounds is such to assure a freezing point of the mixtures prepared, respectively, in B and in C, with the above requirements.

The organic compounds soluble in the latex aqueous phase usable in steps B and C of the invention process have a solubility in water higher than 1% w/w and are preferably liquid at room temperature (20-25° C.). $C_1$-$C_5$ aliphatic alcohols, for example ethyl alcohol, $C_3$-$C_4$ ketones as, for example, acetone, diols for example ethylene glycol and propylene glycol can, for example, be mentioned; ethyl alcohol is preferred.

Examples of electrolytes used in C are inorganic salts, inorganic bases, inorganic acids. Examples of inorganic salts are aluminum sulphate, sodium sulphate; examples of inorganic bases are potassium hydroxide and sodium hydroxide; examples of inorganic acids are nitric acid, hydrochloric acid. Preferably inorganic salts and inorganic acids, more preferably aluminum sulphate and nitric acid, are used.

In step F, as said, there is the gel formation from the polymeric latex. Preferably, during the dripping of the cooled mixture obtained in D into the cooled solution obtained in E, the latter is kept under stirring so that the gel remains in suspension and does not deposit on the reactor bottom. Soft stirrings, for example from 10 to 100 rpm, can be used.

In step G the gel washing is generally carried out at temperatures between the one used in step F and 80° C., preferably from 10° C. to 40° C. Instead of the water it is possible to use also neutral and/or acid aqueous solutions having pH from 1 to 7.

Preferably, at the end of this step the gel pH is brought to a value between 3 and 7, for example by washing with water.

In the optional step H drying is carried out at temperatures in the range 60° C.-140° C., preferably 90° C.-110° C., until a constant weight of the residue.

The process to prepare the gels of the present invention can be carried out batchwise or continuously.

It has been unexpectedly and surprisingly found by the Applicant that the invention fluoroelastomeric gel allows to obtain manufactured articles having an improved thermal resistance, improved sealing properties, improved mechanical propeties compared with those obtainable with the fluoroelastomers obtained by latex coagulation according to the prior art.

When the fluoroelastomeric gel is dried as, for example, described in the optional step H, a fluoroelastomer is obtained which is crosslinked to produce manufactured articles to be used, as said, in the preparation of O-ring, gaskets, shaft seals, fuel hoses, etc., having an improved thermal resistance, improved sealing properties, improved mechanical properties in comparison with those obtainable according to the prior art.

The fluoroelastomers obtainable from the fluoroelastomeric gel, for example by using the optional step H of the invention process, are cured for obtaining manufactured articles having the improved combination of the above properties.

The results obtained by the Applicant with the present invention are, as said, surprising and unexpected since they are not obtainable with the coagulation process carried out according to the prior art, generally comprising the following steps:

latex coagulation by using destabilizing electrolytes (salts, bases or acids);
separation of the coagulated polymer from the mother liquors;
optionally, polymer washing with water;
polymer drying.

See the comparative Examples.

The fluoroelastomers of the present invention can be cured by ionic, peroxidic or mixed way.

When curing is carried out by peroxidic way, preferably the fluoroelastomer contains in the chain and/or in end position to the macromolecule iodine and/or bromine atoms. The introduction in the fluoroelastomeric matrix of such iodine and/or bromine atoms can be carried out by the addition of brominated and/or iodinated "cure-site" comonomers, as bromo and/or iodo olefins having from 2 to 10 carbon atoms, as described, for example, in patents U.S. Pat. Nos. 4,035,565 4,694,045, or iodo and/or bromo fluoroalkylvinylethers, as described in patents U.S. Pat. Nos. 4,745,165, 4,564,662 and EP 199,138, in amounts such that the content of "cure-site" comonomers in the end product is generally from 0.05 to 4 moles per 100 moles of the other basic monomeric units.

Other iodinated usable compounds are the tri-iodinated compounds deriving from triazines as described in the European patent application EP 860,436 and in the European patent application EP 979,832.

Alternatively or also in combination with "cure-site" comonomers, it is possible to introduce in the fluoroelastomer iodine and/or bromine atoms in end position by addition to the reaction mixture of iodinated and/or brominated chain transfer agents as, for example, the compounds of formula $R''_f(I)_{xi}(Br)_{yi}$, wherein $R''_f$ is a (per)fluoroalkyl or a (per)fluorochloroalkyl having from 1 to 8 carbon atoms, xi and yi are integers between 0 and 2, with $1 \leq xi+yi \leq 2$ (see, for example, patents U.S. Pat. Nos. 4,243,770 and 4,943,622). It is also possible to use as chain transfer agents alkaline or alkaline-earth metal iodides and/or bromides, according to patent U.S. Pat. No. 5,173,553.

The total iodine and/or bromine amount in end position ranges from 0.001% to 3% by weight, preferably from 0.01% to 1.5% by weight with respect to the total polymer weight.

Preferably the invention fluoroelastomers contain iodine; more preferably iodine is in end position.

In combination with the chain transfer agents containing iodine and/or bromine, other chain transfer agents known in the prior art, as ethyl acetate, diethylmalonate, etc., can be used.

To the curing blend other products are then added as, for example, the following:

peroxides capable to generate radicals by heating, for example: dialkylperoxides, in particular di-terbutyl-peroxide and 2,5-dimethyl-2,5-di(terbutylperoxy)hexane; dialkylarylperoxides as, for example, dicumyl peroxide; dibenzoyl peroxide; diterbutyl perbenzoate; di[1,3-dimethyl-3-(terbutylperoxy) butyl]-carbonate. Other peroxidic systems are described, for example, in the patent applications EP 136,596 and EP 410,351. The peroxide amount is generally from 0.5% to 10% by weight with respect to the polymer, preferably 0.6%-4% by weight;

curing coagents, in amounts generally between 0.5 and 10%, preferably between 1 and 7% by weight with respect to the polymer; among them, bis-olefins of formula (I); triallyl-cyanurate, triallyl-isocyanurate (TAIC), tris-(diallylamine)-s-triazine; triallylphosphite; N,N-diallyl-acrylamide; N,N,N',N' -tetraallyl-malonamide; trivinyl-isocyanurate; and 4,6-tri-vinyl-methyl-trisiloxane, etc., are commonly used: TAIC and the bis-olefin of formula $$CH_2=CH-(CF_2)_6-CH=CH_2;$$

are particularly preferred; optionally a metal compound, in amounts between 1 and 15%, preferably from 2 to 10% by weight with respect to the polymer, selected from divalent metal oxides or hydroxides as, for example, Mg, Zn, Ca or Pb, optionally associated to a weak acid salt, as stearates, benzoates, carbonates, oxalates or phosphites of Ba, Na, K, Pb, Ca;

other conventional additives, as mineral fillers, semicrystalline fluoropolymers in powder, pigments, antioxidants, stabilizers and the like.

When curing is ionically carried out, curing and accelerating agents known in the prior art are added. The accelerating agent amounts are in the range 0.05-5 phr, the curing agent 0.5-15 phr, preferably 1-6 phr.

As curing agents, polyhydroxylated aromatic or aliphatic compounds or their derivatives can be used, as described, for example, in EP 335,705 and U.S. Pat. No. 4,233,427. Among them we remember in particular: di-, tri- and tetra-hydroxy benzenes, naphthalenes or anthracenes: bisphenols, wherein the two aromatic rings are connected each other by an aliphatic, cycloaliphatic or aromatic bivalent radical, or by one oxygen or sulphur atom, or also a carbonyl group. The aromatic rings can be substituted by one or more chlorine, fluorine, bromine atoms, or by carbonyls, alkyls, acyls. The bisphenol AF is particularly preferred.

As accelerating agents it can, for example, be used: quaternary ammonium or phosphonium salts (see for example EP 335,705 and U.S. Pat. No. 3,876,654); amino-phosphonium salts (see, for example, U.S. Pat. No. 4,259,463); phosphoranes (see, for example, U.S. Pat. No. 3,752,787); imine compounds described in EP 182,299 and EP 120,462; etc. Quaternary phosphonium salts and amino-phosphonium salts are preferred.

Instead of using the accelerating and the curing agent separately, it can also be used from 1 to 5 phr (from 2 to 4.5 preferred) of an adduct between an accelerating agent and a curing agent in a molar ratio from 1:2 to 1:5, preferably from 1:3 to 1:5, the accelerating agent being one of the onium-organic compounds having a positive charge, as defined above, the curing agent being selected from the above compounds, in particular di- or polyhydroxyl or di- or polythiol; the adduct being obtained by melting of the reaction product between accelerating agent and curing agent in the indicated molar ratios, or by melting of the mixture of the adduct 1:1 additioned with the curing agent in the indicated amounts. Optionally also an excess of the accelerating agent can be present with respect to that contained in the adduct, generally in an amount from 0.05 to 0.5 phr.

For the adduct preparation there are particularly preferred as cations: 1,1-diphenyl-1-benzyl-N-diethyl-phosphoranamine and tetrabutyl phosphonium; among anions, bisphenol compounds wherein the two aromatic rings are linked by a bivalent radical selected from perfluoroalkyl groups from 3 to 7 carbon atoms, and the OH are in para positions, are particularly preferred.

The adduct preparation is described in European patent application in the name of the Applicant EP 684,277 herein incorporated by reference.

The curing blend contains furthermore:
i) one or more inorganic acid acceptors selected from those known in ionic curing of vinylidene fluoride copolymers, in amounts 1-40 parts per 100 parts of fluoroelastomeric copolymer;
ii) one or more basic compounds selected from those known in ionic curing of vinylidene fluoride copolymers, in amounts from 0.5 to 10 parts per 100 parts of fluoroelastomeric copolymer.

The basic compounds of point ii) are commonly selected in the group constituted of $Ca(OH)_2$, $Sr(OH)_2$, $Ba(OH)_2$, weak acid metal salts, such as for example carbonates, benzoates, oxalates and phosphites of Ca, Sr, Ba, Na and K and mixtures of the aforesaid hydroxides with the aforesaid metal salts; among the compounds of the type i) MgO can be mentioned.

The mentioned amounts of the blend components are referred to 100 phr of the invention copolymer or terpolymer. To the curing blend other conventional additives, as thickeners, pigments, antioxidants, stabilizers and the like can then be added.

The gel obtained with the invention process can be used to confer an improved chemical resistance and a reduced permeability to solvents, to sealing manufactured articles, for example O-ring or shaft seals, obtained with hydrogenated elastomers. To this purpose the gel is preferably additioned of crosslinking ingredients, for example those above mentioned, the obtained mixture is spread on the coating and cured.

Examples of hydrogenated elastomers are: polyisoprene, poly(styrene/butadiene), poly(acrylonitrile/butadiene), poly(ethylene/propylene/diene), polychloroprene, polyurethanes, polyisobutylene.

The polymer Tg is determined by DSC on a latex portion, coagulated by conventional methods, and dried in a stove at 90° C. until a constant weight. See ASTM D 3418.

The following Examples are given for illustrative but not limitative purpose of the present invention.

EXAMPLES

Example A

Preparation of the Microemulsion

To prepare 1 liter of microemulsion the following ingredients are mixed in a vessel:

220.7 ml of a perfluoropolyoxyalkylene having acid end groups of formula:

$$CF_2ClO(CF_2-CF(CF_3)O)_n(CF_2O)_mCF_2COOH$$

wherein n/m=10, having average molecular weight 600;
220.7 ml of an aqueous solution of $NH_4OH$ at 30% by volume;
427.6 ml of demineralized water;
131 ml di Galden® D02 of formula:

wherein n/m=20, having average molecular weight of 450.

Example B

Polymerization of the Fluoroelastomer Latex containing 67% by Weight of Fluorine 14.5 liters of demineralized water and 145 ml of a microemulsion obtained according to the Example A were introduced, after evacuation, into a 22 l (liters) steel autoclave, equipped with stirrer working at 460 rpm.

The autoclave was then heated to 80° C. and maintained at said temperature for the whole reaction. Then 30.6 g of 1,4-diiodoperfluorobutane ($C_4F_8I_2$) were introduced into the autoclave.

The mixture of monomers having the following molar composition is then fed: VDF 47.5%, HFP 45%, TFE 7.5 so as to bring the pressure to 25 bar rel (2.5 MPa).

In the autoclave are then introduced:
0.7 g of ammonium persulphate (APS) as initiator;
18 g of bis-olefin of formula $CH_2=CH-(CF_2)_6-CH=CH_2$.

The bis-olefin addition was carried out in 20 portions, each of 0.9 g, starting from the polymerization start and for every 5% increase in the monomer conversion.

The pressure of 25 bar rel (2.5 MPa) is maintained constant for the whole polymerization by feeding a mixture having the following molar composition: VDF 70%, HFP 19%, TFE 11%.

After having fed 6,600 g of the monomeric mixture, the autoclave is cooled and the latex discharged. The reaction lasted on the whole 180 min.

The so obtained latex has a concentration equal to 297 $g_{polymer}/kg_{latex}$ and is used in the invention Examples and in the comparative Examples of Table 1.

50 ml of the latex are coagulated by dripping in an aluminum sulphate solution. The obtained polymer is dried at 90° C. in an air-circulation oven for 16 hours. By DSC the material Tg is determined, resulting equal to −15° C.

Example C

Obtainment of the Semicrystalline (per)fluoropolymer Latex 6.5 liters of demineralized water and 260 ml of a microemulsion prepared according to the Example A were introduced, after evacuation, in a 10 l autoclave, equipped with stirrer working at 545 rpm.

The autoclave was then heated to 80° C. and maintained at said temperature for the whole reaction. The autoclave was brought to the pressure of 0.6 bar (0.06 MPa) with ethane and then to the pressure of 20 bar (2 MPa) with a monomeric mixture constituted of 6.5% by moles of perfluoromethylvinylether (PMVE) and 93.5% by moles of tetrafluoro-ethylene (TFE).

Then 0.13 g of ammonium persulphate (APS) were then introduced as initiator into the autoclave.

During the reaction the pressure is maintained at 20 bar by continuously feeding the following monomeric mixture: 2% by moles of PMVE and 98% by moles of TFE.

After 160 minutes of reaction, corresponding to 100% of monomer conversion, the autoclave was cooled and the latex discharged.

Example D

Polymerization of the Fluoroelastomer Latex Containing 66% by Weight of Fluorine 15 liters of demineralized water and 60 ml of a microemulsion obtained according to the Example A were introduced, after evacuation, in a 22 l (liters) horizontal steel autoclave, equipped with stirrer working at 40 rpm.

The autoclave was then heated to 122° C. and maintained at said temperature for the whole reaction.

Then the mixture of monomers having the following molar composition is fed: VDF 52.0%, HFP 48%, so as to bring the pressure to 35 bar rel (3.5 MPa).

18.2 g of di-terbutyl peroxide are then introduced as initiator into the autoclave.

The pressure of 35 bar rel (3.5 MPa) is maintained constant for the whole polymerization by feeding a mixture having the following molar composition: VDF 78.5%, HFP 21.5%.

After having fed 4,500 g of the monomeric mixture, the autoclave is cooled and the latex discharged. The reaction lasted on the whole 210 min.

The so obtained latex has a concentration equal to 230.5 $g_{polymer}/kg_{latex}$ and is used in the invention Examples and in the comparative Examples of Table 2.

50 ml of the latex are coagulated by dripping in an aluminum sulphate solution. The obtained polymer is dried at 90° C. in an air-circulation oven for 16 hours. By DSC the material Tg is determined, resulting equal to −22° C.

Example 1

Latex Gelling and Gel Washing 8 l of demineralized water, 9 l of ethyl alcohol at 95% in water and 8 l of the latex prepared according to the Example B are fed in sequence in a 30 l (liters) jacketed glass reactor and equipped with stirrer. The reactor content is brought to the temperature of −20° C.

17 l of demineralized water, 9 l of ethyl alcohol at 95% in water, and 1.0 l of a nitric acid solution in water at 20% by weight are fed in sequence in another 70 l jacketed glass reactor and equipped with stirrer. The reactor content is brought to the temperature of −20° C.

Successively, by means of a peristaltic pump, the content of the 30 l reactor is fed under stirring into the 70 l reactor, maintaining the temperature at −20° C.

When the feeding is over, stirring is stopped; the obtained gel is allowed to separate on the bottom and the aqueous supernatant phase is drained.

The temperature is brought to 10° C. and one proceeds then to carry out 4 washings: for each of said washings 25 l of demineralized water are fed under stirring to the 70 l reactor. The material is let under stirring for 10 minutes, stirring is stopped and the aqueous supernatant phase is drained.

At the end of the fourth washing, the aqueous phase has a pH equal to 3.5. The fluoroelastomeric gel is discharged from the reactor bottom. The obtained gel contains 40% by weight of fluoroelastomer, density equal to 1.2 $g/cm^3$, and has an appearance of a transparent gelatinous solid. Then, by pressing the imbibition water is removed; it results to have a pH equal to 2.9. Successively the polymer is dried at 90° C. in an air-circulation oven for 16 hours.

The obtained polymer is mixed by using an open mixer with the crosslinking ingredients indicated in Table 1. The so obtained mixture is molded at 170° C. for 8 min.

The obtained results are reported in Table 1.

Example 2 (Comparative)

Latex Coagulation with Aluminum Sulphate

All the operations described in this Example, where not otherwise indicated, are carried out at room temperature (20° C.-25° C.)

15 l of demineralized water and 90 g of hydrated aluminum sulphate ($Al_2(SO_4)_3 \cdot 13H_2O$) are fed in sequence in a 40 l glass reactor equipped with stirrer. Then 8 l of the latex produced according to the Example B are let drip under stirring.

When the feeding is over, stirring is stopped; the coagulated polymer is allowed to separate on the bottom and the aqueous supernatant phase is drained. One proceeds then to carry out 4 washings: for each of said washings 25 of demineralized water are fed under stirring to the reactor.

The material is let under stirring for 10 minutes, stirring is stopped and the aqueous supernatant phase is drained.

At the end of the fourth washing, the polymer is discharged from the reactor bottom; the imbibition water is removed by pressing. Successively the polymer is dried at 90° C. in an air-circulation oven for 16 hours.

One proceeds then to the preparation of the blend and to the characterizations as described in the Example 1.

Example 3

Latex Gelling and Gel Washing 8 l of demineralized water, 9 l of ethyl alcohol at 95% in water, 4.8 l of the fluoroelastomer latex prepared according to the Example B and 3.2 l of the semicrystalline (per)fluoropolymer latex prepared according to the Example C are fed in sequence into a 30 l jacketed glass reactor equipped with stirrer. The reactor content is brought to the temperature of −20° C.

17 l of demineralized water, 9 l of ethyl alcohol at 95% in water, and 1.0 l of a nitric acid solution in water at 20% by weight are fed in sequence into another 70 l jacketed glass reactor and equipped with stirrer. The reactor content is brought to the temperature of −20° C.

Successively, by a peristaltic pump, the content of the 30 l reactor is fed under stirring into the 70 l reactor, maintaining the temperature at −20° C.

When the feeding is over, stirring is stopped; the obtained gel is allowed to separate on the bottom and the aqueous supernatant phase is drained.

The temperature is brought to 10° C. and one proceeds then to carry out 4 washings: for each of said washings 25 l of demineralized water are fed under stirring into the 70 l reactor. The material is let under stirring for 10 minutes, stirring is stopped and the aqueous supernatant phase is drained.

At the end of the fourth washing, the aqueous phase has a pH equal to 4.2. The fluoropolymeric gel is discharged from the reactor bottom. The obtained gel contains 45% by weight of fluoropolymer, density equal to 1.45 g/cm³, and has an appearance of a transparent gelatinous solid. Then, by pressing the imbibition water is removed; it results to have a pH equal to 3.5. Successively the polymer is dried at 90° C. in an air-circulation oven for 16 hours.

The obtained polymer is mixed by using an open mixer with the crosslinking ingredients indicated in Table 1. The so obtained mixture is molded at 170° C. for 8 min.

The obtained results are reported in Table 1.

Example 4 (Comparative)

Latex Coagulation with Aluminum Sulphate

All the operations described in this Example, where not otherwise indicated, are carried out at room temperature (20° C.-25° C.).

15 l of demineralized water and 90 g of hydrated aluminum sulphate ($Al_2(SO_4)_3 \cdot 13H_2O$) are fed in sequence into a 40 l glass reactor equipped with stirrer. Then a mixture composed of 4.8 l of the latex produced according to the Example B and 3.2 l of the latex prepared according to the Example C is let drip under stirring.

When the feeding is over, stirring is stopped; the coagulated polymer is allowed to separate on the bottom and the aqueous supernatant phase is drained. One proceeds then to carry out 4 washings: for each of said washings 25 l of demineralized water are fed under stirring into the reactor.

The material is let under stirring for 10 minutes, stirring is stopped and the aqueous supernatant phase is drained.

At the end of the fourth washing, the polymer is discharged from the reactor bottom; the imbibition water is removed by pressing. Successively the polymer is dried at 90° C. in an air-circulation oven for 16 hours.

One proceeds then to the preparation of the blend and to the characterizations as described in the Example 3.

Example 5

Latex Gelling and Gel Washing 8 l of demineralized water, 10 l of ethyl alcohol at 95% in water and 8 l of the latex prepared according to the Example D are fed in sequence into a 30 l (liters) jacketed glass reactor equipped with stirrer. The reactor content is brought to the temperature of −26° C.

17 l of demineralized water, 10 l of ethyl alcohol at 95% in water, and 1.0 l of a nitric acid solution in water at 20% by weight are fed in sequence into another 70 l jacketed glass reactor equipped with stirrer. The reactor content is brought to the temperature of −26° C.

Successively, by a peristaltic pump, the content of the 30 l reactor is fed under stirring into the 70 l reactor, maintaining the temperature at −26° C.

When the feeding is over, stirring is stopped; the obtained gel is allowed to separate on the bottom and the aqueous supernatant phase is drained.

The temperature is brought to 10° C. and one proceeds then to carry out 4 washings: for each of said washings 25 l of demineralized water are fed under stirring into the 70 l reactor. The material is let under stirring for 10 minutes, stirring is stopped and the aqueous supernatant phase is drained.

At the end of the fourth washing, the aqueous phase has a pH equal to 3.7. The fluoroelastomeric gel is discharged from the reactor bottom. The obtained gel contains 46% by weight of fluoroelastomer, density equal to 1.4 g/cm³, and has an appearance of a transparent gelatinous solid. Then, by pressing the imbibition water is removed; it results to have a pH equal to 2.3. Successively the polymer is dried at 90° C. in an air-circulation oven for 16 hours.

The obtained polymer is mixed by using an open mixer with the crosslinking ingredients indicated in Table 2. The so obtained mixture is molded at 170° C. for 8 min.

The obtained results are reported in Table 2.

Example 6 (Comparative)

Latex Coagulum with Aluminum Sulphate

All the operations described in this Example, where not otherwise indicated, are carried out at room temperature (20° C.-25° C.).

15 l of demineralized water and 90 g of hydrated aluminum sulphate ($Al_2(SO_4)_3 \cdot 13H_2O$) are fed in sequence into a 40 l glass reactor equipped with stirrer. Then 8 l of the latex produced according to the Example D are let drip under stirring.

When the feeding is over, stirring is stopped; the coagulated polymer is allowed to separate on the bottom and the aqueous supernatant phase is drained. One proceeds then to carry out 4 washings: for each of said washings 25 l of demineralized water are fed under stirring into the reactor. The material is let under stirring for 10 minutes, stirring is stopped and the aqueous supernatant phase is drained.

At the end of the fourth washing, the polymer is discharged from the reactor bottom; the imbibition water is removed by pressing. Successively the polymer is dried at 90° C. in an air-circulation oven for 16 hours.

One proceeds then to the preparation of the blend and to the characterizations as described in the Example 5.

Comment to the Results Reported in Tables 1 and 2

The results of the Tables show that the cured manufactured articles obtained from the invention fluoroelastomers have improved thermal resistance properties (see the mechanical properties data after thermal treatment) and improved compression set in comparison with the manufactured articles of the same polymers obtained according to the prior art.

TABLE 1

| Composition in phr | Ex. 1 | Ex. 2 comp. | Ex. 3 | Ex. 4 comp |
|---|---|---|---|---|
| Polymer | 100 | 100 | 100 | 100 |
| TAIC Drimix ® | 2 | 2 | 2 | 2 |
| Luperox ® 101 XL 45 | 1 | 1 | 1.5 | 1.5 |
| ZnO | — | — | 3 | 3 |
| BaSO₄ | 3 | 3 | — | — |
| Mechanical properties after post-treatment: | | | | |
| 1 hour of gradient + 4 hours of residence at 230° C. (ASTM D 412C) | | | | |
| Stress at break (MPa) | 11.5 | 10.8 | 19.2 | 18 |
| Elongation at break (%) | 520 | 512 | 445 | 430 |
| Hardness (Shore A) | 46 | 48 | 79 | 80 |
| Thermal treatment: 70 hours at 250° C. (ASTM D 573) | | | | |
| Δ % Stress at break | −32 | −61 | −3 | −35 |
| Δ % Elongation at break | +2 | +20 | +5 | +17 |
| Δ Hardness (Shore A) | 0 | −1 | −1 | −5 |
| Compression set: 70 hours a 200° C. (ASTM D 395 method B) | | | | |
| O-ring #214 | 38 | 52 | 35 | 47 |

TABLE 2

| Composition in phr | Ex. 5 | Ex. 6 comp |
|---|---|---|
| Polymer | 100 | 100 |
| Tecnoflon FOR XA51 ® | 2.5 | 2.5 |
| Bisphenol AF | 0.3 | 0.3 |
| MgO | 7 | 7 |
| Black ® N990 MT | 30 | 30 |
| Mechanical properties after post-treatment: | | |
| 1 hour at 250° C. (ASTM D 412C) | | |
| Stress at break (MPa) | 19.5 | 18.6 |
| Elongation at break (%) | 215 | 202 |
| Hardness (Shore A) | 70 | 72 |
| Thermal treatment: 70 hours at 275° C. (ASTM D 573) | | |
| Δ % Stress at break | −10 | −35 |
| Δ % Elongation at break | −7 | −35 |
| Δ Hardness (Shore A) | +1 | +1 |
| Compression set: 70 hours at 200° C.(ASTM D395 method B) | | |
| O-ring #214 | 17 | 19 |

Tecnoflon FOR XA51 ® is the adduct between bisphenol AF and 1,1-diphenyl-1-benzyl-N-diethylphosphoramine in the ratio by weight 5:1.

The invention claimed is:

1. Fluoroelastomeric gel comprising a fluoroelastomeric latex, and having the following properties:
   appearance: transparent gelatinous solid;
   water content between 10% and 90% by weight; and
   density between 1.1 and 2.1 g/cm³,
   wherein said gel comprises a VDF-based fluoroelastomer mixed with at least one (per)fluorinated comonomer having at least one ethylene-type unsaturation, wherein said (per)fluorinated comonomer is a fluorinated comonomer that is optionally perfluorinated,
   wherein said gel is not crosslinked in its uncured state,
   wherein when said gel is dried in a stove at 90° C. until it reaches a constant weight, it gives a curable fluoroelastomer, and
   wherein said gel is obtained by a process comprising the steps of combining a fluoroelastomeric latex with an aqueous solution at a temperature lower than or equal to the glass transition temperature of the fluoroelastomeric latex to form the fluoroelastomeric gel, wherein said aqueous solution comprises an electrolyte and one or more organic compounds, wherein said one or more organic compounds are soluble in the fluoroelastomeric latex and are capable of lowering the freezing point of the fluoroelastomeric latex, and wherein said one or more organic compounds are either the fluorinated comonomer or a different organic compound;
   and optionally washing the fluoroelastomeric gel with water.

2. Fluoroelastomeric gel according to claim 1, wherein the (per)fluorinated comonomer is selected from the following:
   $CF_2=CFOR_f$ (per)fluoroalkylvinylethers (PAVE), wherein $R_f$ is a $C_1$-$C_6$ (per)fluoroalkyl;
   $CF_2=CFOX$ (per)fluoro-oxyalkylvinylethers, wherein X is a $C_1$-$C_{12}$ (per)fluorooxyalkyl, having one or more ether groups;
   (per)fluorodioxoles;
   (per)fluorovinylethers (MOVE) of formula $CFX_{AI}=CX_{AI}OCF_2OR_{AI}$ wherein $R_{AI}$ is a $C_2$-$C_6$ linear, branched or $C_5$-$C_6$ cyclic perfluoroalkyl group, or a $C_2$-$C_6$ linear, branched perfluorooxyalkyl group containing from one to three oxygen atoms; $R_{AI}$ can optionally contain from 1 to 2 atoms, equal or different, selected from the following: Cl, Br, I; $X_{AI}$=F;
   $C_2$-$C_8$ (per)fluoroolefins;
   $C_2$-$C_8$ fluoroolefins optionally containing one or more chlorine, bromine, or iodine atoms; and
   (per)fluorovinylethers containing hydrocyanic groups.

3. Fluoroelastomeric gel according to claim 1, wherein the monomeric compositions of the fluoroelastomers are the following, the sum of the comonomer per cent (by moles) being 100%:
(a) VDF 45-85%, HFP 15-45%, TFE 0-30%;
(b) VDF 50-80%, PAVE 5-50%, TFE 0-20%;
(c) VDF 20-30%, OI 10-30%, HFP and/or PAVE 18-27%, TFE 10-30%;
(d) TFE 45-65%, OI 20-55%, VDF 0-30%;
(e) TEE 33-75%, PAVE 15-45%, VDF 5-30%;
(f) VDF 45-85%, MOVE 1 5-50%, PAVE 0-50%; HFP 0-30%, TFE 0-30%;
(g) VDF 45-85%, MOVE 2 5-50%, PAVE 0-50%; HFP 0-30%, TFE 0-30%;
(h) VDF 45-85%, MOVE 2 5-50%, MOVE 1 5-50%, PAVE 0-50%; HFP 0-30%, TFE 0-30%.

4. Fluoroelastomeric gel according to claim 1, wherein the fluoroelastomers comprise also monomeric units deriving from a bis-olefin of general formula:

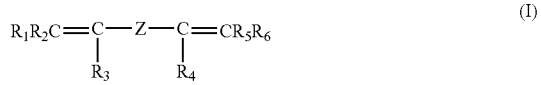

wherein:
$R_1, R_2, R_3, R_4, R_5, R_6$, equal to or different from each other, are H or $C_1$-$C_5$ alkyls;
Z is a $C_1$-$C_{18}$ linear or branched alkylene or cycloalkylene radical, optionally containing oxygen atoms or a (per)fluoropolyoxyalkylene radical.

5. Fluoroelastomeric gel according to claim 4, wherein, in formula (I),
when Z is a $C_4$-$C_{12}$ perfluoroalkylene radical; $R_1, R_2, R_3, R_4, R_5, R_6$ are hydrogen;
when Z is a (per)fluoropolyoxyalkylene radical, it comprises units selected from the following:

—$CF_2CF_2O$—, —$CF_2CF(CF_3)O$—,

—$CF_2CF_2CF_2O$—, —$CF_2$—$CH_2CH_2O$—, —$CF(CF_3)CF_2O$—, or —$CFX_1O$— wherein $X_1$ is selected from the group consisting of F and $CF_3$.

6. Fluoroelastomeric gel according to claim 4, wherein Z has formula:

-(Q)$_p$-$CF_2O$—($CF_2CF_2O$)$_m$($CF_2O$)$_n$—$CF_2$-(Q)$_p$-  (II)

wherein: Q is a $C_1$-$C_{10}$ alkylene or oxyalkylene radical; p is 0 or 1; m and n are numbers such that the m/n ratio is between 0.2 and 5 and the molecular weight of said (per)fluoropolyoxyalkylene radical is in the range 500-10,000.

7. Fluoroelastomeric gel according to claim 6 wherein Q is selected from:

—$CH_2OCH_2$—; —$CH_2O(CH_2CH_2O)_sCH_2$—, s being=1-3.

8. Fluoroelastomeric gel according to claim 4, wherein the unit amount in the chain deriving from the bis-olefins of formula (I) is from 0.01 to 1.0 moles per 100 moles of the other monomeric units constituting the basic fluoroelastomer structure.

9. Fluoroelastomeric gel according to claim 1, containing a semicrystalline (per)fluoropolymer, in an amount in per cent by weight referred to the total of dry weight fluoroelastomer+ semicrystalline (per)fluoropolymer, from 0% to 70% by weight.

10. Fluoroelastomeric gel according to claim 9, wherein the semicrystalline (per)fluoropolymer is constituted by tetrafluoroethylene (TFE) homopolymers, or TFE copolymers with one or more monomers containing at least one unsaturation of ethylene type, in an amount from 0.01% to 10% by moles on the total of the monomer moles.

11. Fluoroelastomeric gel according to claim 10, wherein the comonomers having an ethylene unsaturation of the semicrystalline (per)fluoropolymer are both hydrogenated and fluorinated.

12. Fluoroelastomeric gel according to claim 11, wherein the hydrogenated comonomers having an ethylene unsaturation are selected from ethylene, propylene, acrylic monomers, selected from methylmethacrylate, (meth)acrylic acid, butylacrylate, hydroxyethylhexylacrylate, styrene monomers.

13. Fluoroelastomeric gel according to claim 11, wherein the fluorinated comonomers having an ethylene unsaturation are selected from the following:
$C_3$-$C_8$ perfluoroolefins;
$C_2$-$C_8$ hydrogenated fluoroolefins;
$C_2$-$C_8$ chloro- and/or bromo- and/or iodo-fluoroolefins;
$CF_2$=$CFOR_f$ (per)fluoroalkylvinylethers (PAVE), wherein $R_f$ is a $C_1$-$C_6$ (per)fluoroalkyl;
$CF_2$=$CFOX$ (per)fluoro-oxyalkylvinylethers, wherein X is: a $C_1$-$C_{12}$ alkyl, or a $C_1$-$C_{12}$ oxyalkyl, or a $C_1$-$C_{12}$ (per)fluoro-oxyalkyl having one or more ether groups; (per)fluorodioxoles.

14. Fluoroelastomeric gel according to claim 10, wherein the comonomers of the semicrystalline (per)fluoropolymer are selected from PAVE and (per)fluorodioxoles.

15. Fluoroelastomeric gel according to claim 10, wherein the semicrystalline (per)fluoropolymer is coated by a shell of a semicrystalline (per)fluoropolymer containing bromine and/or iodine atoms in the chain deriving from brominated and/or iodinated comonomers, in an amount from 0.1% to 10% by moles referred to the total moles of the basic monomeric units of the semicrystalline (per)fluoropolymer core+shell, the semicrystalline (per)fluoropolymer in the core and in the shell can be of different composition.

16. Fluoroelastomeric gel according to claim 2, wherein the (per)fluorodioxoles are perfluorodioxoles.

17. Fluoroelastomeric gel according to claim 2, wherein the (per)fluorovinylethers (MOVE) of formula $CFX_{AF}$=$CX_{AF}OCF_2OR_{AF}$ are selected from (MOVE 1) $CF_2$=$CFOCF_2OCF_2CF_3$ and (MOVE 2) $CF_2$=$CFOCF_2OCF_2CF_2OCF_3$.

18. Fluoroelastomeric gel according to claim 2, wherein the $C_2$-$C_3$ (per)fluoroolefins are selected from tetrafluoroethylene, hexafluoropropene, hydropentafluoropropene, and vinyl fluoride.

19. Fluoroelastomeric gel according to claim 4, wherein when Z a $C_1$-$C_{18}$ linear or branched alkylene or cycloalkylene radical, Z is at least partially fluorinated.

20. Fluoroelastomeric gel according to claim 5, wherein, in formula (I), when Z is a $C_4$-$C_8$ perfluoroalkylene radical; $R_1, R_2, R_3, R_4, R_5, R_6$ are hydrogen.

21. Fluoroelastomeric gel according to claim 6, wherein the molecular weight of said (per)fluoropolyoxyalkylene radical is in the range 700-2,000.

22. Fluoroelastomeric gel according to claim 8, wherein the unit amount in the chain deriving from the bis-olefins of formula (I) is from 0.03 to 0.5 moles per 100 moles of the other monomeric units constituting the basic fluoroelastomer structure.

23. Fluoroelastomeric gel according to claim 22, wherein the unit amount in the chain deriving from the bis-olefins of formula (I) is from 0.05 to 0.2 moles per 100 moles of the other monomeric units constituting the basic fluoroelastomer structure.

24. Fluoroelastomeric gel according to claim 9, containing a semicrystalline (per)fluoropolymer, in an amount in per cent by weight referred to the total of dry weight fluoroelastomer semicrystalline perfluoropolymer, from 0% to 50% by weight.

25. Fluoroelastomeric gel according to claim 24, containing a semicrystalline (per)fluoropolymer, in an amount in per cent by weight referred to the total of dry weight fluoroelastomer+semicrystalline perfluoropolymer, from 2% to 30% by weight.

26. Fluoroelastomeric gel according to claim 10, wherein the semicrystalline (per)fluoropolymer is constituted by tetrafluoroethylene (TFE) homopolymers, or TFE copolymers with one or more monomers containing at least one unsaturation of ethylene type, in an amount from 0.05% to 7% by moles on the total of the monomer moles.

27. Fluoroelastomeric gel according to claim 13, wherein the $C_3$-$C_8$ perfluoroolefins are selected from hexafluoropropene (HFP) and hexafluoroisobutene.

28. Fluoroelastomeric gel according to claim 13, wherein the $C_2$-$C_8$ hydrogenated fluoroolefins are selected from vinyl fluoride (VF), vinylidene fluoride (VDF), trifluoro-ethylene, and $CH_2$=$CH$—$R_f$ perfluoroalkylethylene, wherein $R_f$ is a $C_1$-$C_6$ perfluoroalkyl.

29. Fluoroelastomeric gel according to claim 13, wherein the $C_2$-$C_8$ chloro-fluoroolefins are chlorotrifluoroethylene (CTFE).

30. Fluoroelastomeric gel according to claim 13, wherein $R_f$ is a $C_1$-$C_6$ (per)fluoroalkyl selected from $CF_3$, $C_2F_5$, and $C_3F_7$.

31. Fluoroelastomeric gel according to claim 13, wherein the (per)fluorodioxoles are perfluorodioxoles.

32. Fluoroelastomeric gel according to claim 14, wherein PAVE is selected from perfluoromethyl-, perfluoroethyl-, and perfluoropropylvinylether.

33. Fluoroelastomeric gel according to claim 14, wherein (per)fluorodioxoles are perfluorodioxoles.

34. Curable fluoroelastomers obtained from the fluoroelastomeric gel of claim 1.

35. Cured fluoroelastomers obtained by crosslinking the fluoroelastomers according to claim 34.

36. Cured fluoroelastomers obtained by crosslinking the fluoroelastomers according to claim 34, wherein crosslinking is of peroxidic type.

37. Cured fluoroelastomers obtained by crosslinking the fluoroelastomers according to claim 34, wherein crosslinking is of ionic type, optionally ionic-peroxidic type.

38. Manufactured articles comprising the cured fluoroelastomers according to claim 35.

* * * * *